(12) United States Patent
Wittosch et al.

(10) Patent No.: US 6,548,120 B1
(45) Date of Patent: Apr. 15, 2003

(54) RECYCLABLE AND REPULPABLE REAM WRAP AND RELATED METHODS OF MANUFACTURE

(75) Inventors: William A. Wittosch, Warwick, NY (US); David J. Romanowicz, Erie, PA (US); Bruce Rose, Poughkeepsie, NY (US); Donna J. Wenzel, Middletown, NY (US); Gene W. Bartholomew, Tuxedo Park, NY (US); James R. Quick, Greenwood Lake, NY (US); Morton S. Delozier, Claryville, NY (US); Maxine Klass-Hoffman, Highland Mills, NY (US)

(73) Assignee: International Paper Company, Stamford, CT (US)

( * ) Notice: Subject to any disclaimer, the term of this patent is extended or adjusted under 35 U.S.C. 154(b) by 0 days.

(21) Appl. No.: 09/444,630

(22) Filed: Nov. 22, 1999

Related U.S. Application Data (60) Division of application No. 08/359,767, filed on Dec. 20, 1994, now Pat. No. 5,989,724, which is a continuation-in-part of application No. 08/290,276, filed on Aug. 15, 1994, now Pat. No. 5,837,383, which is a continuation-in-part of application No. 08/059,790, filed on May 10, 1993, now Pat. No. 5,763,100.

(51) Int. Cl.$^7$ .............. B05D 1/36; B05D 7/00
(52) U.S. Cl. .......... 427/411; 427/385.5; 427/395; 427/407.1
(58) Field of Search ............ 427/407.1, 411, 427/385.5, 386, 391, 395

(56) References Cited

U.S. PATENT DOCUMENTS

| | | | |
|---|---|---|---|
| 2,392,972 A | * | 1/1946 | Cheyney ............ 117/76 |
| 3,196,038 A | | 7/1965 | Schoch et al. ........ 117/68 |

(List continued on next page.)

FOREIGN PATENT DOCUMENTS

| | | |
|---|---|---|
| DE | A-41 11 510 | 10/1993 |
| EP | A-0 375 924 | 7/1990 |
| EP | A-0 671 506 | 2/1995 |
| JP | A-63 005943 | 1/1988 |
| WO | WO 93/25057 | 9/1993 |
| WO | WO 94 26513 | 11/1994 |

OTHER PUBLICATIONS

VAPO–STOP, Cham–Tenero Paper Mills, Inc. Cham, Switzerland.
AIRFLEX 100 HS, Air Products and Chemicals, Inc., Allentown, Pennsylvania.
PRECOAT 44, Michelman, Inc., 9080 Shell Road, Cincinnatti, Ohio.
SERFENE 121, Morton International Specialty Chemicals Group, 333 West Wacker Drive, Chicago, Illinois. (1/91).
GEON @ 650×18 LATEX. B.F. Goodrich, 9911 Brecksville Road, Cleveland, Ohio. (1990).
VAPORCOAT, Michelman, Inc., 9080 Shell Road, Cincinnatti, Ohio.

*Primary Examiner*—Shrive P. Beck
*Assistant Examiner*—Rebecca A. Blanton
(74) *Attorney, Agent, or Firm*—Dara L. Onofrio, Esq.; Onofrio Law (57) ABSTRACT

Recyclable and repulpable coated paper stock, preferably for use as ream wrap, comprising a substrate coated on at least one surface with a base coat and at least one additional coat over said base coat. Both coats are water based dispersions of a polymer selected from the group consisting of acrylic polymers, acrylic copolymers, polyvinyl acetate, polyvinyl alcohol, ethylene-vinyl acetate, polyvinyl chloride, styrene butadiene copolymers, polyvinylidene chloride and its copolymers, or starch. The wax free coating forms a pin-hole free continuous film on the substrate which is resistant to water and water vapor. The invention also includes processes for making and recycling the invented coated paper stocks.

16 Claims, 5 Drawing Sheets

U.S. PATENT DOCUMENTS

| | | | |
|---|---|---|---|
| 3,251,709 A | 5/1966 | Bonzagni | 117/76 |
| 3,306,766 A | 2/1967 | Hathway et al. | 117/76 |
| 3,423,232 A * | 1/1969 | Reinhard et al. | 427/412.2 |
| 3,476,587 A | 11/1969 | Demol et al. | 117/76 |
| 3,573,125 A | 3/1971 | Elliott | 156/244 |
| 3,579,371 A | 5/1971 | Dooley et al. | 117/76 |
| 3,707,393 A * | 12/1972 | McDonald | 156/218 |
| 3,873,345 A | 3/1975 | Vreeland | 117/65.2 |
| 4,117,199 A | 9/1978 | Gotoh et al. | 428/486 |
| 4,248,939 A | 2/1981 | Parsons | 428/508 |
| 4,265,969 A | 5/1981 | Yasuda et al. | 428/342 |
| 4,301,210 A * | 11/1981 | Yasuda et al. | 427/358 |
| 4,714,727 A | 12/1987 | Hume, III | 524/271 |
| 4,844,952 A | 7/1989 | Korenkiewicz et al. | 427/258 |
| 5,169,715 A | 12/1992 | Maubert et al. | 428/331 |
| 5,250,383 A * | 10/1993 | Naruse | 427/477 |
| 5,654,039 A * | 8/1997 | Wenzel et al. | 162/137 |
| 5,773,131 A * | 6/1998 | Dettling | 428/201 |

* cited by examiner

RECYCLABLE AND REPULPABLE REAM WRAP AND RELATED METHODS OF MANUFACTURE

This application is a divisional of co-pending application Ser. No. 08/359,767, now U.S. Pat. No. 5,989,724, filed on Dec. 20, 1994, which is a continuation-in-part of Ser. No. 08/290,276, now U.S. Pat No. 5,837,383, filed on Aug. 15, 1994 which is a continuation-in-part of Ser. No. 08/059,790, now U.S. Pat. No. 5,763,100, filed on May 10, 1993, which are incorporated herein by reference.

FIELD OF INVENTION

This invention generally relates to recyclable and repulpable coated paper stocks and related methods of making the same useful as packages, containers or labels having water resistance, grease resistance and moisture vapor barrier characteristics. More particularly, it concerns coated paper stocks, preferably for use as ream wrap, comprised of a substrate coated on at least one surface with a base coat and at least one additional coat over said base coat both of which are applied as wax free water based polymeric dispersions. The water based dispersion coatings are repulped and recycled more readily than conventional polyethylene or wax coatings.

BACKGROUND ART

Polyethylene films and wax coatings, which are generally laminated or coated to paper, are widely used in packaging applications to protect products from moisture and provide water or grease resistance. However, recycling of packaging containing polyethylene films and wax coatings are limited and costly since special equipment is necessary for repulping and various process steps are required prior to reintroducing such a slurry into a recycling stream along with office waste paper. In addition, polyethylene films and some wax coatings will not degrade if the package is composted. These problems are encountered in specific packaging application areas, for example, where such coatings are used in the production of ream wrap.

Conventional ream wraps are typically a multi-ply product having a center ply of polyethylene in between two ply's of paper. Polyethylene is used in ream wraps to provide an effective barrier to water vapor (humidity) which can cause the wrapped paper to curl resulting in misfeeds and jams in copy machines or printing presses. These multilayered plastic film ream wraps cannot easily be recycled. Landfills and incineration are the common ways to dispose of polyethylene packaging materials. Alternatively, other coatings and coating systems are known which do not contain polyethylene but provide the level of moisture resistance necessary for ream wrap. For example, U.S. Pat. No. 4,117,199 to Gotoh et al. discloses a repulpable coated paper containing a synthetic rubber latex and a wax emulsion. Coatings such as Vapo-Stop, manufactured by Cham-Tenero Paper Mills, Inc., Cham, Switzerland, include a styrene-butadiene polymer, wax and acrylic polymer components which provide moisture resistance to coated substrates. These systems however contain a high loading of wax which make the formulation unacceptable for recycling as office waste and repulping for white paper production.

Thus it would be desirable to find an alternative for conventional polyethylene films and coatings containing wax that has comparable moisture barrier properties but also has the added benefit of repulpability and recyclablity.

U.S. Pat. No. 2,392,972 to Cheyney discloses surfacing of paper with a coating of vinylidene chloride-vinyl chloride copolymers to produce a coated paper which is resistant to the transmission of water vapor. Other representative patents which describe use of polyvinylidene chloride as a means for imparting water vapor resistance to paper include U.S. Pat. Nos. 3,476,587 to Demol et al. which discloses compositions comprising two vinylidene chloride copolymers, one hard and the other supple, to waterproof a substrate and U.S. Pat. No. 3,423,232 to Reinhard et al. which discloses coating flat substrates with aqueous dispersions including 80–98% vinylidene chloride polymers as a subcoating and top coating.

U.S. Pat. No. 3,306,766 to Hathaway et al. discloses a resin coated packaging product, preferably a paper based sheet, having the exposed surface thereof coated with a haloethylene polymer resin, such as saran, and an intermediate flexible foundation coating of extruded ethylene-lower alkyl acrylate copolymer resin. The haloethylene polymer resins, e.g. saran, are resistant to the passage of water vapor and include at least 60% by weight of polyvinylidene chloride resins.

From the prior art mentioned it is seen that coatings which include vinylidene chloride copolymers to provide a moisture barrier are known, however, the prior art does not provide a method for directly applying these coatings to a porous substrate. It would be appreciated that advantage over known applications would be obtained by providing wax free aqueous coatings directly applied to a substrate surface to impart water and water vapor resistance properties comparable to conventional polyethylene or wax coatings but are repulped and recycled more readily. The present invention is directed to the provision of such recyclable and repulpable coatings to produce a coated paper product for use as ream wrap. The water-based coatings of the invention provide an alternative to conventional polyethylene coatings and wax coatings and an advantage over the prior art since the coated paper can easily be repulped without special flotation equipment, which is needed when repulping polyethylene film. The water-based coatings disperse in water, allowing the paper fibers to be easily reclaimed for reuse. The invention coatings, unlike wax-coatings, are repulped and recycled along with office wastepaper to produce a high grade white paper.

Accordingly, it is a broad object of the invention to provide a recyclable and repulpable coated paper stock comprised of a substrate coated with a base coat and at least one additional coat over the base coat, both of which are wax free water-based polymeric dispersions.

An object of the invention is to provide a recyclable and repulpable coated paper stock which is formed into a package, container or label.

A more specific object of the invention is to provide a recyclable and repulpable coated paper stock, for use as ream wrap, having water resistance, grease resistance and moisture vapor barrier characteristics.

A specific object of the invention is to provide a coated paper stock that is readily recycled without dependence on special equipment for repulping.

A more specific object of the invention is to provide a coated paper stock that is readily repulped and recycled along with office waste paper to produce a high grade white paper.

DISCLOSURE OF INVENTION

In the present invention, these purposes, as well as others which will be apparent, are achieved generally by coating at least one surface of a substrate with a base coat and at least one additional coat over the base coat both of which are applied as water-based polymeric dispersions. Alternate embodiments include applying at least one further additional coat.

The base coat and additional coat or coats are free of any wax component and comprise a water-based dispersion of a polymer selected from the group comprising acrylic polymers, acrylic copolymers, polyvinyl acetate, polyvinyl alcohol, ethylene-vinyl acetate, polyvinyl chloride, styrene-butadiene copolymers, polyvinylidene chloride and its copolymers, or starch. Typically, the coatings comprise dispersions having a solids content greater than 20% and a viscosity in the range of 20 to 1000 cps.

In a preferred embodiment, the base coat comprises an acrylic modified poly(ethylacrylate) latex and the additional coat comprises polyvinylidene chloride or copolymers thereof. In another preferred embodiment the base coat and additional coat comprise polyvinylidene chloride or copolymers thereof. Additionally, in either embodiment at least one further additional coat of the same materials may be applied. The invention however is not limited to these embodiments, which are meant to be illustrative, but also include numerous variations thereof.

The base coat may additionally include pigments or mineral fillers, such as, but not limited to, aqueous dispersions of clay, calcium carbonate or mica. Other additional components of the coatings may include thickening agents, defoaming or antifoaming agents, pigments, crosslinking agents, slip additives, release agents and antiblocking agents.

Substrates employed in the invention are cellulose-based materials and include a variety of coated and uncoated paper and paperboard, including bleached or unbleached, hardwood or softwood, virgin or recycled, and clay coated or uncoated forms of paper or paperboard. The basis weight of the substrates are in the range of 20 to 150 lbs per 3,000 sq. ft. and the thicknesses range from 0.004 to 0.025 inches. A preferred substrate is paper and is selected from the group comprising bleached paper, clay-coated bleached paper, unbleached paper or recycled paper.

The coatings are applied to the substrate surface as aqueous dispersions. The coatings are dried on the substrate surface to form a pin-hole free continuous film on the substrate which is resistant to water and water vapor. Water vapor transmission rates of the coated stocks are typically in the range of 0.8 to 7 g/100 sq.in./24 hr, and preferably between 1 to 3 g/100 sq.in./24 hr. Depending on the composition of the base coat, the base coat is either partially dried or totally dried prior to the application of the additional coat.

The individual coating layers each have dry coating weights in the range of 1 to 8 lbs. per 3,000 sq. ft. The total dry coating weights on the substrate are in the range of 1 to 16 lbs. per 3,000 sq. ft.

The recyclable and repulpable coated paper stock of the invention is formed into a package, preferably ream wrap, having water resistance, moisture vapor barrier characteristics and grease resistance. In preferred applications the water-based coating corresponds to a moisture vapor barrier located in the internal structure of the package which prevents enclosed materials, such as copy paper, from warping or curling.

In other applications, the coating may be applied to the opposite side of a clay coated substrate and used as a label, where the clay coated side provides a printable surface and the invention coating provides barrier characteristics to the resulting container.

The wax free coatings of the invention are repulped and recycled more readily than conventional polyethylene or wax coatings. Advantageously, the coated paper stock can be added directly to an office waste paper recycling stream, without dependence on special equipment, to produce a high grade white paper.

Other objects, features, and advantages of the present invention will become apparent from the following detailed description of the best mode of practicing the invention when considered with reference to the drawings, as follows:

DETAILED DESCRIPTION OF THE PREFERRED EMBODIMENT

Aqueous barrier coatings and related methods of manufacture are disclosed in co-pending application Ser. No. 08/290,276, now U.S. Pat. No. 5,837,383, filed on Aug. 15, 1994, which is a continuation-in-part of Ser. No. 08/059,790, now U.S. Pat. No. 5,763,100, filed May 10, 1993, both of which are incorporated herein by reference. The present invention compositions are modifications and improvements of these formulations and provide composition coatings which are free of any wax component specifically used to produce coated paper stocks that have comparable barrier characteristics to conventional polyethylene or wax coatings. These invention coatings are repulped and recycled more readily than the conventional coatings and can be added directly to an office waste paper recycling stream, without dependence on special equipment, to produce a high grade white paper.

Figure 2:
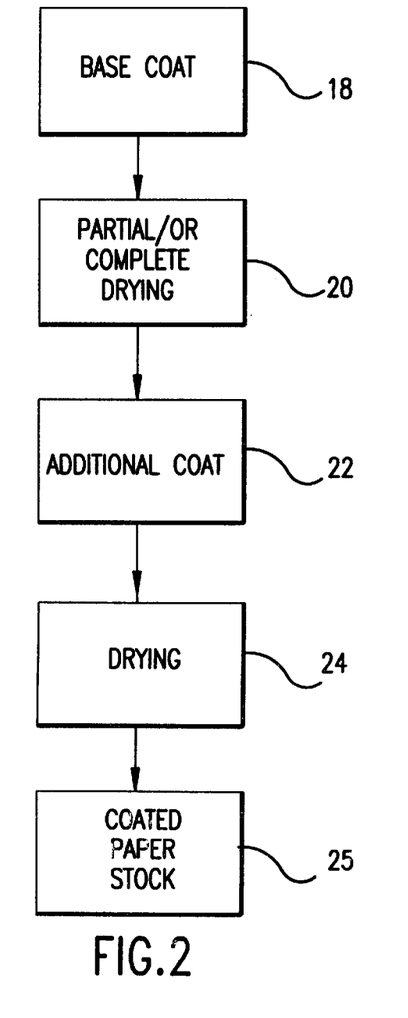
FIG. 2 is a schematic diagram of the method of the invention.

FIG. 2 is a schematic diagram of the general method of the invention. In the first step 18 a base coat is applied to at least one surface of a substrate. The base coat substantially seals the porous substrate surface. The base is generally applied using conventional coating equipment such as rotogravure, flexographic, air knife, blade or Meyer rod coaters. Depending on the composition of the base coat, the base coat is either partially dried or completely dried prior to the application of the additional coat, using forced hot air ovens. The additional coat 22 is applied over the base coat and dried 24, to form a pinhole-free continuous film which imparts barrier properties to the coated paper stock 26. Oven temperatures and line speeds are dictated by choice of the base and additional coating formulations (e.g. % solids), substrate (e.g. basis weight, absorptivity) and equipment characteristics. Sufficient drying conditions, such as the oven temperature, line speed, etc., are required to prevent roll blocking and picking or blistering of the coating during rewinding of the coated substrate.

Figure 1:
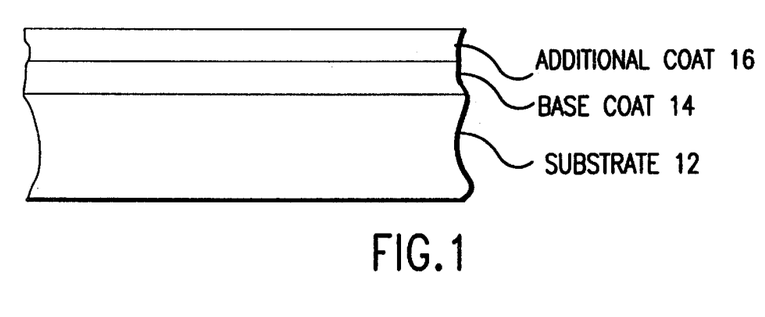
FIG. 1 is an illustration of a recyclable and repulpable coated paper stock made in accordance with the method of the invention.

In accordance with the invention as shown in FIG. 1 the recyclable and repulpable coated paper stocks are generally comprised of a substrate 12 coated on at least one surface with a base coat 14 and at least one additional coat 16 over the base coat. The base coat and additional coat or coats are both water-based polymeric emulsions or dispersions. The terms "emulsions" and "dispersions" are often used interchangeably. In *Hackh's Chemical Dictionary,* 4th ed., 1969, a dispersed system (or dispersion) is defined as "an apparently homogeneous substance which consists of a microscopically heterogeneous mixture of two or more finely divided phases (solid, liquid or gaseous) e.g. liquid and liquid, solid and gas, etc." An emulsion is defined as "a suspension of a liquid in another liquid" and is considered a type of dispersion. As used in the specification herein in describing the invention coatings the general term "dispersion" is typically used. At ambient temperatures the coating compositions are generally solid/liquid dispersions, however, the compositions may also be emulsions or liquid/liquid dispersions.

The base coat and additional coat or coats are free of any wax component. The base coat essentially seals the substrate surface and in itself decreases the penetration of the additional coat into the substrate. The coatings comprise a water-based dispersion of a polymer selected from the group comprising acrylic polymers, acrylic copolymers, polyvinyl acetate, polyvinyl alcohol, ethylene-vinyl acetate, polyvinyl chloride, styrene-butadiene copolymers, polyvinylidene chloride and its copolymers, or starch.

The solids content of each coating layer is generally greater than 20%, and preferably 40–55%, to result in sufficient dry add-on levels which are in the range of 1 to 8 lbs/3MSF, and to reduce drying demands. Preferably the base coat is in the range of 2.0 to 3.5 and the additional coat between 3.5 to 5.0. Total dry coating weights on the substrate surface are in the range of 1 to 16 lbs. per 3,000 sq. ft. The viscosity of the coating is preferably in the range of 20 to 1000 cps. The low viscosities of the compositions results in little penetration into the substrate surface but enough for adhesion or binding of the coating to the substrate surface.

Typically, at least one base coat is applied to the substrate surface, but in alternate embodiments at least one further coat of the same material may be applied prior to the application of the additional coat. A single base coat on the substrate surface imparts moisture barrier characteristics to the substrate, however, the presence of multiple coating layers increases the barrier properties. The water vapor transmission rates of the coated stocks are typically in the range of 0.8 to 7 g/100 sq.in./24 hr, and preferably between 1 to 3 g/l00 sq.in./24 hr.

The coatings are applied to the substrate surface as aqueous dispersions. The coatings are dried on the substrate surface to form a pin-hole free continuous film on the substrate which is resistant to water and water vapor. Depending on the composition of the base coat, the base coat is either partially dried or totally dried prior to the application of the additional coat to insure proper adhesion.

In a preferred embodiment, the base coat comprises an acrylic modified poly(ethylacrylate) latex and the additional coat comprises polyvinylidene chloride or copolymers thereof. During the process of producing this embodiment, it is critical that the base coat be partially dried, if not there typically will be incomplete adhesion of the additional coating layer. In another preferred embodiment the base coat and additional coat both comprise polyvinylidene chloride or copolymers thereof. In the process of making this embodiment the base coat is completely dried prior to the application of the additional coat, which consists of the same material. This results in multiple thin coating layers which advantageously increases the barrier characteristics of the coated substrate. Additionally, in either embodiment at least one further additional coat of the same coating materials may be applied. The invention is not limited to these embodiments, which are meant to be illustrative, but also include numerous variations thereof.

The materials that comprise the coatings are generally available commercially under various trademarks and from various manufacturers. Representative polymers or dispersions that may be used include, but are not limited to: Airflex®100 HS which is a water-based ethylene vinylacetate emulsion available from Air Products and Chemicals, Inc., Allentown, Pa., 18195; PRECOAT 44 which is a water-based acrylic (poly ethylacrylate latex) emulsion available from Michelman, Inc., 9080 Shell Road, Cincinnatti, Ohio, 45236-1299; SERFENE®121 which is a polyvinylidene chloride (PVDC) latex available from Morton International Specialty Chemicals Group, 333 West Wacker Drive, Chicago, Ill., 60606-1292, and GEON$^{SM}$650X18 LATEX which is a water-based polyvinylidene chloride available from B. F. Goodrich, 9911 Brecksville Road, Cleveland, Ohio, 44141-3247. The physical characteristics and properties of these commercially available materials are further described in technical data sheets which are incorporated herein by reference.

The aforementioned polymer dispersions may be combined with other materials to impart specific characteristics to the base coat. For example, a pigment or mineral filler, such as but not limited to, aqueous dispersions of clay, calcium carbonate or mica, may be incorporated into the coating to provide improved leveling, smoothing and sealing of a rough or porous substrate.

Other additional components of the coatings may include thickening agents, defoaming or antifoaming agents, pigments, crosslinking agents, slip additives, release agents and antiblocking agents.

Substrates employed in the invention are cellulbse-based materials and include a variety of coated and uncoated paper and paperboard, including bleached or unbleached, hardwood or softwood, virgin or recycled, and clay coated or uncoated forms of paper or paperboard. In ream wrap applications the substrate is preferably any form of bleached white paper. The basis weight of the substrates are in the range of 20 to 150 lbs per 3,000 sq. ft. and the thicknesses range from 0.004 to 0.025 inches. For ream wrap applications where the substrate is a bleached paper, the basis weight is preferably 20 to 90 lbs per 3,000 sq. ft., and for a clay coated paper substrate, preferably 60 lbs per 3,000 sq. ft.

The water based coatings of the invention are applied as aqueous dispersions to the substrate by any method of coating suitable for water based coatings. Examples of suitable coating methods include conventional methods such as air knife coating, blade coating, metering roll coating, gravure coating, rod coating, curtain coating and spraying. Generally some type of elevated temperature drying will be required in order to dry the water based coatings at an acceptable production speed. Partial drying is preferably at temperatures in the range of 220–250° F. and complete drying at 350–390° F. Suitable drying methods include, but are not limited to, hot air drying, infrared drying and drying by contact with a heated drum.

In other applications the coated paper stock is formed into a label which provides additional barrier properties to any surface it is adhered to. In a preferred embodiment of this application, the invention coatings may be applied to the opposite side of a clay coated substrate where the clay coated side provides a printable surface and the coating imparts barrier characteristics to the container.

In a preferred embodiment, the-substrate is a calendered, bleached paper with a basis weight of 50 lb/3MSF. The base coat is an acrylic latex emulsion with a solids content of 44% and a viscosity of 250 to 450 cps. The base coat is applied using Meyer rod application resulting in a dry add-on level of 1–3.5 lbs/3MSF. The base coat is partially dried by passing through hot air ovens set at 250° F. prior to application of the additional coat. The additional coat is preferably a polyvinylidene chloride copolymer latex. Generally, this additional coating has a viscosity of 40 to 75 cps. The additional coat is applied at a dry add-on level of 1 to 8 lbs/3MSF using a Meyer rod assembly. The coated substrate is again passed through hot air ovens set at 350° F. to set the coating. Additional coating layers may be added. The total dry add-on levels for all the coating layers range from 2.0 to 16 lb/3MSF.

The following Examples, 1 to 6, represent the various coating formulations and procedures used in producing the coated paper stocks of the invention. Example 7 illustrates the effect on barrier properties upon removal of portions of the wax component from an acrylic/wax emulsion coating. In the examples the coating weights referred to are dry coating weights unless otherwise specified. These examples are merely representative and are not inclusive of all the possible embodiments of the invention.

The water vapor transmission rate and water resistance (30 min Cobb test) of the examples were measured. In addition, in Example 7 the grease resistance (kit levels) were also measured. These functional properties were determined according to following procedures.

The water vapor transmission rate ("WVTR") was determined using TAPPI method T464 om-90 which states "Gravimetric determination of water vapor transmission rate of sheet materials at high temperature and humidity" provides a means of measuring under standardized conditions, the ability of a material to protect against undesirable moisture changes due to the transmission of water vapor through the material. A transmission rate of 3 gm/100 sq"/24 hr., indicates better protection for packaged contents from moisture loss or gain than a transmission rate of 10 gm/100 sq"/24 hr.

The Cobb test, TAPPI method T442 om-84, determines how much water is absorbed by paper and paperboard in a given length of time. Generally for sized materials this measurement is useful in determining the water resistant properties of water-based coatings. The lower the result, the more water resistant the material. A material with a Cobb of 3.45 gm/100 sq" in 10 minutes is less resistant to water than a material with a Cobb of 0.03 gm/100 sq" in 10 minutes. The length of time of the test is dependent upon the substrate being tested. Sized materials will be tested for 120 seconds, whereas, a heavily coated corrugated sample may be tested for 16 hours. The coated substrates of the invention were tested for 30 minutes.

The method used for measuring grease resistance is the Kit Test, USEFUL METHOD 557. This test measures the grease resistance of paper and paperboard materials which are treated at the wet end with fluorochemical sizing agents. This test was not designed to measure grease resistance of continuous films but the results obtained are useful and accepted as an indication of general grease resistance. The higher the Kit test level the better the grease resistance.

EXAMPLE 1

Subtrate is a 50 lb/3MSF bleached white kraft paper. The base coat comprises an acrylic modified poly(ethylacrylate) latex, (44% solids, viscosity of 250 to 450 cps), available as PRECOAT-44 by Michelman, Inc., 9080 Shell Road, Cincinnatti, Ohio, 45236-1299. The additional coats comprise either PRECOAT-44 or a polyvinylidene chloride latex, (50% solids, viscosity of 40 to 75 cps), available as Serfene®121 by Morton International Specialty Chemicals Group, 333 West Wacker Drive, Chicago, Ill., 60606-1292.

The base coat is applied to the substrate and results in dry add-on levels in the range of 2.0 to 3.5 lbs/3MSF. A second coat comprising PRECOAT-44 was applied in a similar manner to the base coat layer and results in dry add-on levels in the range of 2.0 to 3.5 lbs/3MSF. This second coat was partially dried by passing through hot air ovens set at 220–250° F. followed by application of an additional coat comprising Serfene®121. This coating results in dry add-on levels in the range of 3.5 to 5.0 lbs/3MSF. It is noted that the second coat is partially dried to effect adhesion of the additional coating layer. The coated substrate is passed through hot air ovens having temperatures in the range of 350–390° F. to set the coating. The total coating weight on the substrate surface is 8.24 lbs/3MSF.

The aqueous coatings were applied by rod coaters with hot air flotation ovens after each coating station in the temperature ranges indicated above. Ambient temperature air flow was used to cool the coated dry web in combination with a chill roll to prevent blocking in the finished roll.

Figure 3:
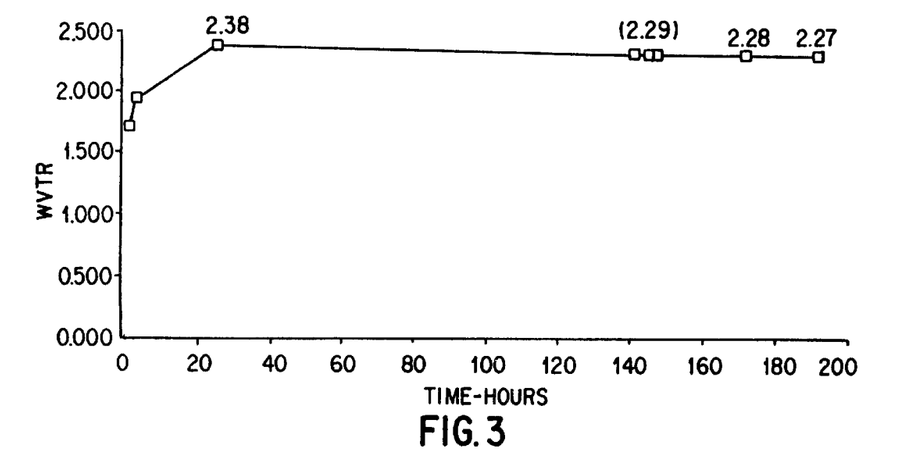
FIGS. 3 to 8 are graphic illustrations of WVTR values as a function of time in accordance with Examples 1 to 6, respectively.

FIG. 3 graphically illustrates the WVTR values as a function of time for the coated substrate in this example, and are also summarized below in Table I. The average WVTR for this coating is 2.3 g/100 sq.in./24 hr.

EXAMPLE 2

The same materials and procedure as in Example 1 were used, except that the total coating weight on the substrate surface is 9.8 g/3MSF.

Figure 4:
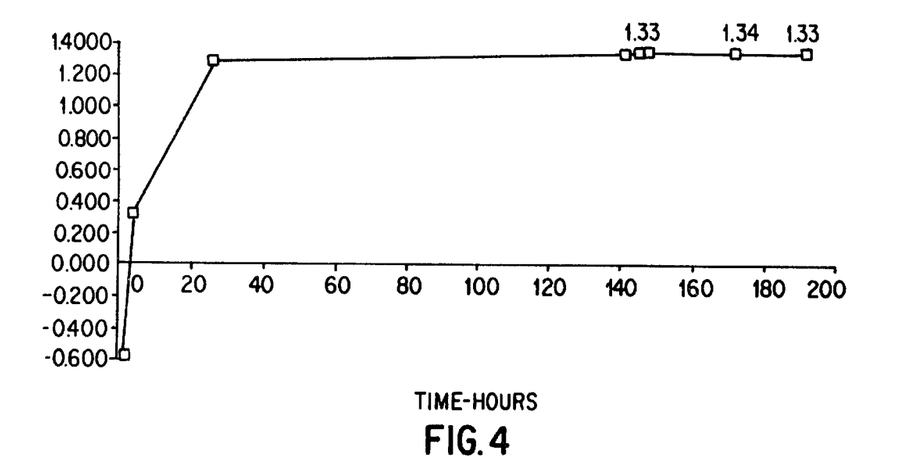

FIG. 4 graphically illustrates the WVTR values as a function of time for the coated substrate in this example, and are also summarized below in Table I. The average WVTR for this coating is 1.3 g/100 sq.in./24 hr.

EXAMPLE 3

Subtrate is a 50 lb/3MSF recycled paper. The base coat comprises a water-based ethylene vinyl-acetate emulsion, (55% solids, viscosity of 250 to 450 cps), available as Airflex®100 HS by Air Products and Chemicals, Inc., Allentown, Pa., 18195. The additional coats comprise either Airflex®100 HS or a polyvinylidene chloride latex, (50% solids, viscosity of 40 to 75 cps), available as Serfene®121 by Morton International Specialty Chemicals Group, 333 West Wacker Drive, Chicago, Ill., 60606-1292.

The base coat is applied to the substrate and results in dry add-on levels in the range of 2.0 to 3.5 lbs/3MSF. A second coat comprising Airflex®100 HS was applied in a similar manner to the base coat layer and results in dry add-on levels in the range of 2.0 to 3.5 lbs/3MSF. This second coat was dried followed by application of an additional coat comprising Serfene®121. This coating results in dry add-on levels in the range of 3.5 to 5.0 lbs/3MSF. The coated substrate is passed through hot air ovens having temperatures in the range of 350–390° F. to set the coating. The total coating weight on the substrate surface is 11.25 lbs/3MSF.

The aqueous coatings were applied by rod coaters and dried with hot air flotation ovens after each coating station.

Ambient temperature air flow was used to cool the coated dry web in combination with a chill roll to prevent blocking in the finished roll.

Figure 5:
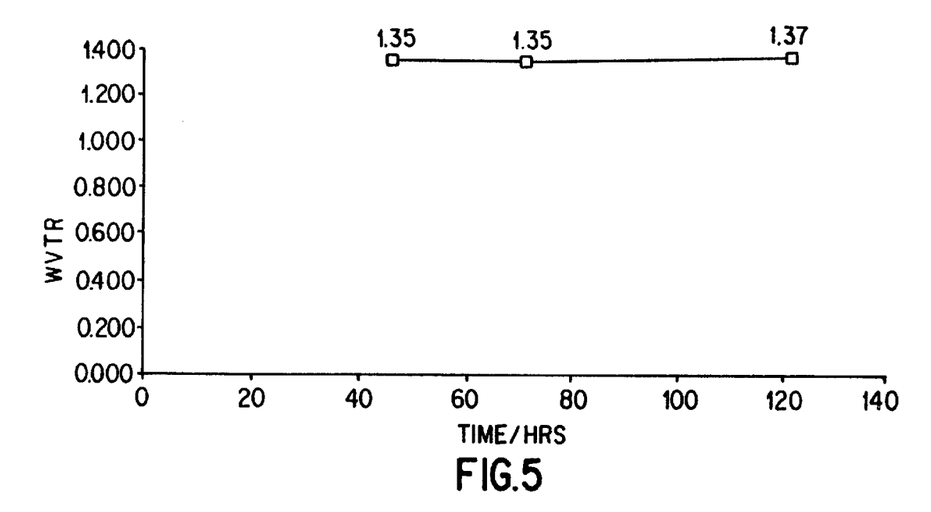

FIG. 5 graphically illustrates the WVTR values as a function of time for the coated substrate in this example, and are also summarized below in Table 1. The average WVTR for this coating is 1.3 g/100 sq.in./24 hr.

TABLE I

EXAMPLES 1 TO 3
WVTR MEASUREMENTS AS A FUNCTION OF TIME
(WVTR - g/100 sq. in./24 hr. - 100% RH/90° F.)

| TIME (HOURS) | EXAMPLE 1 | EXAMPLE 2 | EXAMPLE 3 |
|---|---|---|---|
| 25 | 2.38 | — | — |
| 140–150 | 2.29 | 1.33 | 1.35 |
| 170 | 2.28 | 1.34 | 1.35 |
| 190 | 2.27 | 1.33 | 1.37 |

EXAMPLE 4

Subtrate is a 50 lb/3MSF bleached white paper (machine glazed). The coatings comprise a polyvinylidene chloride latex, (50% solids, viscosity of 40 to 75 cps), available as Serfene®121 by Morton International Specialty Chemicals Group, 333 West Wacker Drive, Chicago, Ill., 60606-1292. In this example, three coating layers are applied to the substrate.

The base coat is applied to the substrate and results in dry add-on levels in the range of 3.5–5.0 lbs/3MSF. Two additional coating layers of the same material are applied and each result in dry add-on levels in the range of 3.5 to 5.0 lbs/3MSF. The coated substrate is passed through hot air ovens having temperatures in the range of 350–390° F. to set the coating. The total coating weight on the substrate surface is 12.6 lbs/3MSF.

The aqueous coatings were applied by rod coaters and dried with hot air flotation ovens after each coating station. Ambient temperature air flow was used to cool the coated dry web in combination with a chill roll to prevent blocking in the finished roll.

Figure 6:
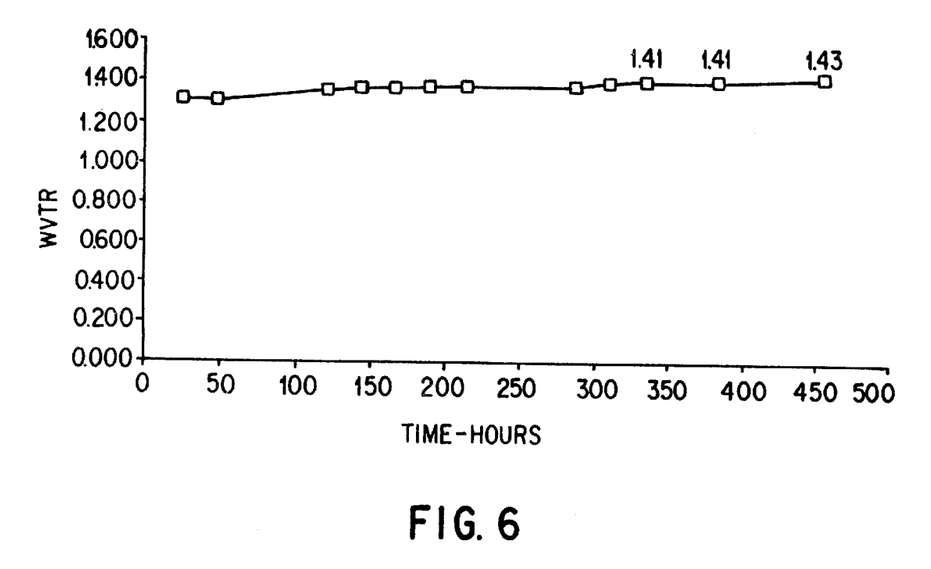

FIG. 6 graphically illustrates the WVTR values as a function of time for the coated substrate in this example, and are also summarized below in Table II. The average WVTR for this coating is 1.4 g/100 sq.in./24 hr.

EXAMPLE 5

The same materials and procedure as in Example 4 were used, except that the total coating weight on the substrate surface is 12.4 g/3MSF.

Figure 7:
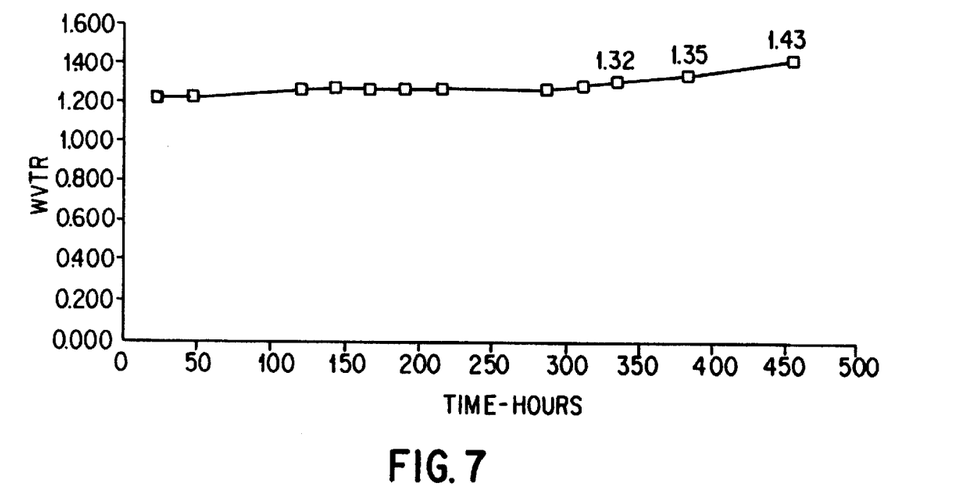

FIG. 7 graphically illustrates the WVTR values as a function of time for the coated substrate in this example, and are also summarized below in Table II. The average WVTR for this coating is 1.3 g/100 sq.in./24 hr.

EXAMPLE 6

The same materials and procedure as in Example 4 were used, except that the total coating weight on the substrate surface is 12.3 g/3MSF.

Figure 8:
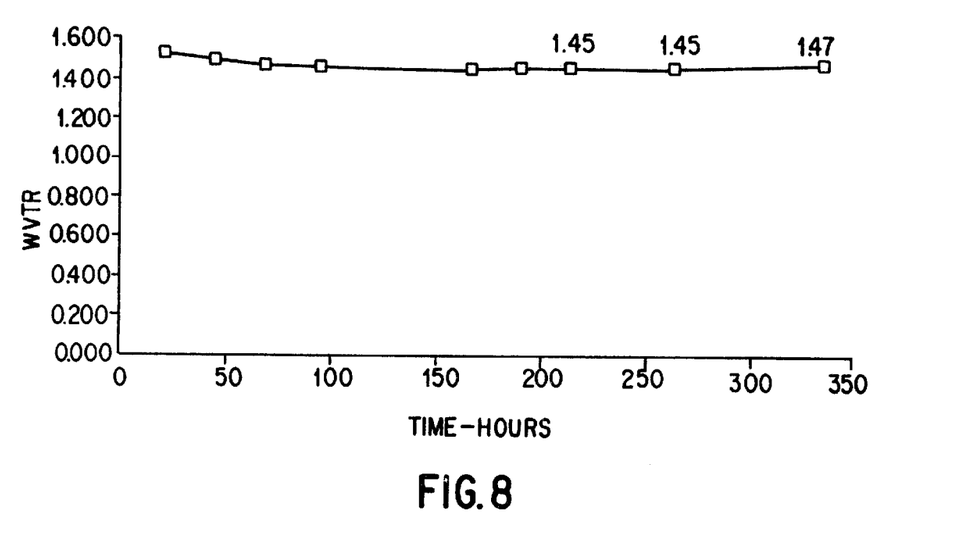

FIG. 8 graphically illustrates the WVTR values as a function of time for the coated substrate in this example, and are also summarized below in Table II. The average WVTR for this coating is 1.4 g/100 sq.in./24 hr.

TABLE II

EXAMPLES 4 TO 6
WVTR MEASUREMENTS AS A FUNCTION OF TIME
(WVTR - g/100 sq. in./24 hr. - 100% RH/90° F.)

| TIME (HOURS) | EXAMPLE 4 | EXAMPLE 5 | EXAMPLE 6 |
|---|---|---|---|
| 340 | 1.41 | 1.32 | 1.45 |
| 390 | 1.41 | 1.35 | 1.45 |
| 450 | 1.43 | 1.43 | 1.47 |

EXAMPLE 7

Figure 9:
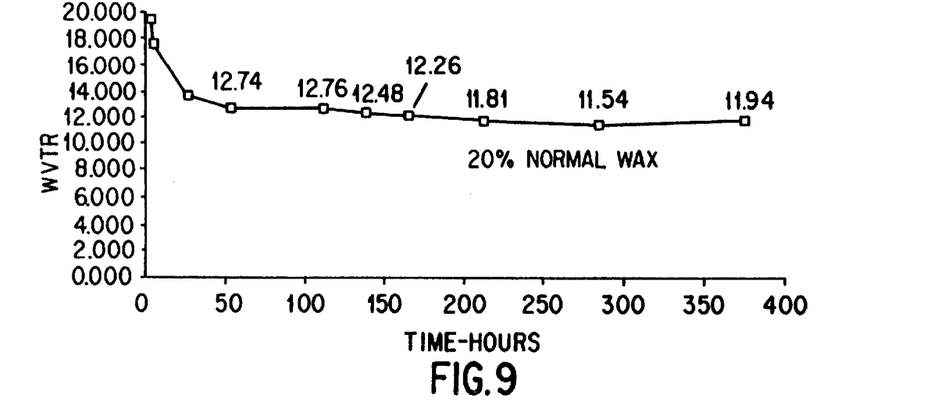
FIGS. 9 to 11 are graphic illustrations of WVTR values as a function of time of a polymer/wax coated substrate in accordance with Example 7, with 80%, 70% and 60%, respectively, of the wax component removed from the coating.
Figure 10:
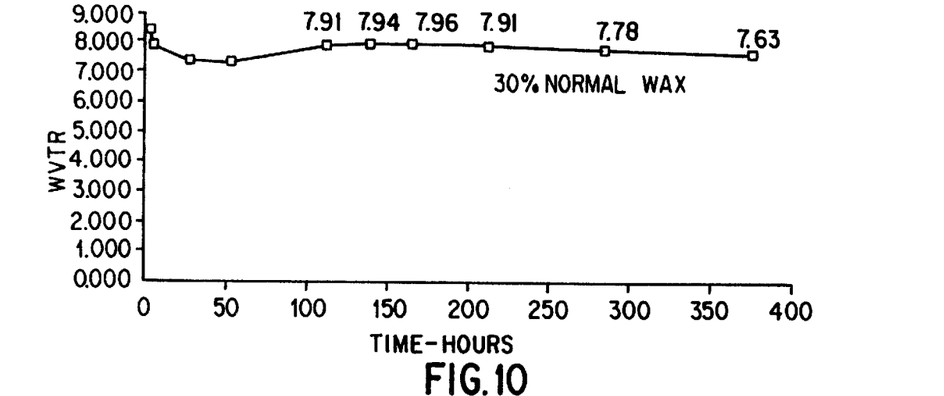
Figure 11:
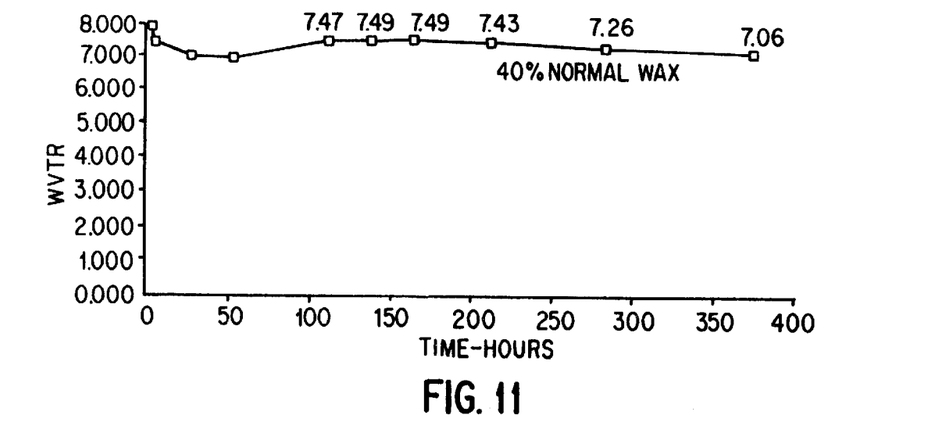

Moisture resistant coatings typically contain high levels of wax to achieve moisture resistance. The wax in coatings of this type, while typically repulpable, leave a waxy residue, i.e. stickies which are unacceptable in the production of recycled fine white papers. In addition, the wax component is referred to as the "active ingredient" and provides the barrier characteristic properties in these coatings, thus removal or lessening of the amount of wax reduces the efficiency of these coatings. In this example and FIGS. 9 to 11, illustrate what occurs when 80 to 60% of the wax component is removed from a coating formulation comprised of an acrylic/wax emulsion coating.

The acrylic/wax emulsion coating used in this example is available as VaporCoat, by Michelman, Inc. 9080 Shell Road, Cincinnati, Ohio, 45236-1299. The emulsion is typically 44% solids with a viscosity in the range of 800 to 1200 cps. The wax component is normally 40% of the emulsion. In this example modifications of the coating were prepared to contain 20%, 30% and 40% of the wax component normally found in the coating, accordingly the wax portion was reduced 80%, 70% and 60%, respectively.

Three samples of a 14 pt. solid bleached sulfite substrate (A, B and C) were coated with a base coat comprising a water-based ethylene vinyl-acetate emulsion, (55% solids, viscosity of 250 to 450 cps), available as Airflex®100 HS, followed by an additional coat of the modified acrylic/wax (VaporCoat) coating with 80%, 70% and 60% of the wax component removed from the formulation, respectively.

The aqueous base coat and modified VaporCoat coatings were applied by rod coaters and dried with hot air ovens after each coating application. FIGS. 9 to 11 graphically illustrate the WVTR values as a function of time for samples A, B and C, respectively, and are also summarized below in Table III. In addition, the samples were tested for 30 min. Cobb and 3M Kit with the results listed in the Table IV below. The Cobb test is a measure of water resistance and WVTR is a measure of moisture resistance. In both tests, the higher the test result numbers the poorer the barrier.

TABLE III

EXAMPLE 7
WVTR MEASUREMENTS AS A FUNCTION OF TIME
(WVTR - g/100 sq. in./24 hr. - 100% RH/90° F.)

| TIME (HOURS) | SAMPLE A 20% | SAMPLE B 30% | SAMPLE C 40% |
|---|---|---|---|
| 55 | 12.74 | — | — |
| 110 | 12.76 | 7.91 | 7.47 |
| 140 | 12.48 | 7.94 | 7.49 |
| 160 | 12.26 | 7.96 | 7.49 |
| 215 | 11.81 | 7.91 | 7.43 |

TABLE III-continued

EXAMPLE 7
WVTR MEASUREMENTS AS A FUNCTION OF TIME
(WVTR - g/100 sq. in./24 hr. - 100% RH/90° F.)

| TIME (HOURS) | SAMPLE A 20% | SAMPLE B 30% | SAMPLE C 40% |
| --- | --- | --- | --- |
| 280 | 11.54 | 7.78 | 7.26 |
| 375 | 11.94 | 7.63 | 7.06 |

TABLE IV

SUMMARY OF BARRIER PROPERTIES OF EXAMPLE 7

| SAMPLE | VAPORCOAT % OF NORMAL WAX AMOUNT | 30 MIN. COBB | 3M KIT | WVTR 100% RH/90° F. |
| --- | --- | --- | --- | --- |
| A | 20% | 0.9981 | 11 | 10.477 |
| B | 30% | 0.8774 | 12 | 7.855 |
| C | 40% | 0.58 | 12 | 7.366 |

As shown in Table III and IV it is seen that the greater the portion of the wax component being removed the barrier characteristics, i.e. the WVTR values, also decrease. For example in sample A in which 80% of the wax component has been removed the average WVTR value is 10.477, whereas in sample C in which only 60% of the was component has been removed the average WVTR value is 7.366. Advantage of the invention coatings is obtained by providing wax free coatings with water vapor transmission rates in the range of 0.8 to 7 g/100 sq.in./24 hr, and preferably between 1 to 3 g/100 sq. in./24 hr. In addition, the absence of a wax component in the invention coatings permits the coated substrates to be repulped and recycled into a high grade white paper.

Repulpability and Recyclability of Invention Coatings

Generally, polyethylene films and coatings are used in paper-based packaging to provide barrier properties, but their presence restricts the recyclability of the packaging to mills that possess expensive separation and screening equipment. It is well known in the industry that polyethylene, or wax coated materials are problematic to the repulping process unless extensive screening and cleaning equipment is used. Even with this equipment, some pieces of coating will pass through to the paper formation section and affect runnability. In addition, fiber yield from polyethylene- or wax-coated products is reduced because of the tendency of fiber adhering to the coating and being removed in the screening process.

The coated paper stocks of the invention are repulpable, especially at elevated temperatures and pH without special equipment and processing. The aqueous barrier films produced by the invention coatings can be readily broken down in the hydrapulper at standard conditions of pH 7–11 and 70–140° F. The invention coatings readily dissociate in an alkaline medium to produce a slurry containing paper fibers and particles of the coating, which are free of any wax component. This slurry is easily introduced directly into an office wastepaper recycling stream. Conventional paper making techniques are used to convert this combined recycling stream into a white paper. The wax free coatings of the invention are repulped and recycled more readily than conventional polyethylene or wax coatings, without dependence on special equipment, to produce a high grade white paper.

The recyclable and repulpable coated paper stock of the invention is formed into a package, preferably ream wrap, having water resistance, moisture vapor barrier characteristics and grease resistance. The water vapor transmission rates are typically in the range of 0.8 to 7 g/100 sq.in./24 hr., and preferably between 1 to 3 g/100 sq.in./24 hr. In preferred applications the aqueous coating corresponds to a moisture vapor barrier located in the internal structure of the package or container, which prevents the enclosed materials, such as copy paper, from warping or curling.

In other applications the coated paper stock is formed into a label which provides additional barrier properties to any surface it is adhered to. In a preferred embodiment of this application, the invention coatings may be applied to the opposite side of a clay coated substrate where the clay coated side provides a printable surface and the coating imparts barrier characteristics to the container.

It will be recognized by those skilled in the art that the paper stocks of the invention and process have wide application in the production of packages or containers having water resistance, grease resistance and moisture vapor barrier characteristics. The present invention provides advantages over prior practice by producing a barrier coated paper stock which can be recycled by conventional methods without any special measures to remove polyethylene or wax coatings. The water-based coatings of the invention break up and disperse with the paper fibers when the material is run through a standard hydrapulper.

The repulped coated stocks can be recycled through regular cleaning equipment and run through conventional paper machines without any problems. The wax free coatings provide increased recycling capability of the coated materials over conventional coatings in the production of high grade white paper.

Finally, variations of the coating compositions and coated products from the examples given herein are possible in view of the above disclosure. Therefore, although the invention has been described with reference to certain preferred embodiments, it will be appreciated that other composite structures and processes for their fabrication may be devised, which are nevertheless within the scope and spirit of the invention as defined in the claims appended hereto.

What is claimed is:

1. A method for manufacturing a recyclable and repulpable coated paper stock comprising:
   providing a substrate;
   applying a base coat to a surface of said substrate;
   applying at least one additional coat over said base coat;
   wherein said base coat and said additional coat are both wax free and consist essentially of a water-based dispersion of a single polymer selected from the group consisting of acrylic polymers, acrylic copolymers, polyvinyl acetate, polyvinyl alcohol, ethylene-vinyl acetate, polyvinyl chloride, styrene-butadiene copolymers, polyvinylidene chloride and its copolymers, and starch; and
   drying said coatings to form a pin-hole free continuous film on said substrate which is resistant to water and water vapor.

2. The method according to claim 1, further comprising partially drying said base coat on said substrate surface prior to application of said additional coat.

3. The method according to claim 1, further comprising drying said base coat on said substrate surface prior to application of said additional coat.

4. The method according to claim 1, wherein said base coat substantially seals said substrate surface.

5. The method according to claim 1, wherein said base coat further includes a pigment or mineral filler.

6. The method according to claim 1, wherein said base coat and said additional coat are water based dispersions with a solids content greater than 20%.

7. The method according to claim 1, wherein said base coat and said additional coat are water based dispersions with a viscosity in the range of 20 to 1000 cps.

8. The method according to claim 1, wherein said base coat results in dry add-on levels in the range of 1 to 8 lb/3MSF on said substrate surface.

9. The method according to claim 1, wherein said additional coat results in dry add-on levels in the range of 1 to 8 lb/3MSF on said base coat.

10. The method according to claim 1, wherein said substrate comprises a cellulose-based material.

11. The method according to claim 10, wherein said cellulose-based material is paper or paperboard.

12. The method according to claim 1, wherein said substrate has a basis weight in the range of 20 to 150 lbs per 3,000 sq. ft. and a thickness in the range of 0.004 to 0.025 inches.

13. The method according to claim 2, wherein said base coat comprises an acrylic modified poly(ethylacrylate) latex and said additional coat comprises polyvinylidene chloride or copolymers thereof.

14. The method according to claim 3, wherein said base coat and said additional coat comprises polyvinylidene chloride or copolymers thereof.

15. The method according to claim 1, wherein said base coat and said additional coat further include thickening agents, defoaming or antifoaming agents, pigments, crosslinking agents, slip additives, release agents and anti-blocking agents.

16. The method according to claim 1, comprising applying at least one further additional coat.

* * * * *